(12) United States Patent
Matsushita et al.

(10) Patent No.: US 12,362,347 B2
(45) Date of Patent: Jul. 15, 2025

(54) ALL SOLID STATE BATTERY

(71) Applicant: TOYOTA JIDOSHA KABUSHIKI KAISHA, Toyota (JP)

(72) Inventors: Yuki Matsushita, Nagoya (JP); Kazuo Yaso, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 236 days.

(21) Appl. No.: 18/170,586

(22) Filed: Feb. 17, 2023

(65) Prior Publication Data

US 2023/0216020 A1 Jul. 6, 2023

Related U.S. Application Data

(63) Continuation of application No. 16/738,013, filed on Jan. 9, 2020, now Pat. No. 11,616,222.

(30) Foreign Application Priority Data

Feb. 6, 2019 (JP) ................. 2019-019555

(51) Int. Cl.
  *H01M 4/13* (2010.01)
  *H01M 4/36* (2006.01)
  (Continued)

(52) U.S. Cl.
  CPC ............. *H01M 4/13* (2013.01); *H01M 4/366* (2013.01); *H01M 4/621* (2013.01); *H01M 4/64* (2013.01);
  (Continued)

(58) Field of Classification Search
  CPC ...... H01M 4/626; H01M 4/621; H01M 4/667; H01M 4/661
  See application file for complete search history.

(56) References Cited

U.S. PATENT DOCUMENTS

| | | | |
|---|---|---|---|
| 2004/0126663 A1 | 7/2004 | Sudano et al. | |
| 2013/0209889 A1 | 8/2013 | Takahata | |

(Continued)

FOREIGN PATENT DOCUMENTS

| | | |
|---|---|---|
| JP | 11144709 A | 5/1999 |
| JP | 2004164865 A | 6/2004 |

(Continued)

OTHER PUBLICATIONS

Yuki Matsushita et al., U.S. Appl. No. 16/738,013, Non-Final Office Action issued Aug. 19, 2021.

(Continued)

*Primary Examiner* — Stephan J Essex
(74) *Attorney, Agent, or Firm* — Dickinson Wright, PLLC (57) ABSTRACT

A main object of the present disclosure is to provide an all solid state battery wherein interface resistance between a current collector and an active material layer is low. In the present disclosure, the above object is achieved by providing an all solid state battery comprising: an electrode including a current collector, an electron conductive layer, and an active material layer, in this order, and a solid electrolyte layer formed on the active material layer side of the electrode, and the electron conductive layer is an agglutinate of metal particles or a metal foil, and electron conductivity of the electron conductive layer is $1\times10^3$ S/cm or more at 25° C.

10 Claims, 7 Drawing Sheets

(51) Int. Cl.
    *H01M 4/62*         (2006.01)
    *H01M 4/64*         (2006.01)
    *H01M 6/18*         (2006.01)
    *H01M 10/052*     (2010.01)
    *H01M 10/0562*    (2010.01)

(52) U.S. Cl.
    CPC .......... *H01M 6/187* (2013.01); *H01M 10/052* (2013.01); *H01M 10/0562* (2013.01); *H01M 2300/0065* (2013.01)

(56) References Cited

U.S. PATENT DOCUMENTS

| | | |
|---|---|---|
| 2014/0120423 A1 | 5/2014 | Matsuo et al. |
| 2014/0199582 A1 | 7/2014 | Sasaki et al. |
| 2017/0033350 A1 | 2/2017 | Mizuno et al. |
| 2017/0207460 A1 | 7/2017 | Hama et al. |
| 2017/0207482 A1 | 7/2017 | Tomura et al. |
| 2017/0352866 A1 | 12/2017 | Kawai |
| 2019/0067680 A1 | 2/2019 | Ohsawa et al. |

FOREIGN PATENT DOCUMENTS

| | | | |
|---|---|---|---|
| JP | 2010073648 A | 4/2010 | |
| JP | 2012104422 A | 5/2012 | |
| JP | 2014017199 A | 1/2014 | |
| JP | 2014150052 A | 8/2014 | |
| JP | 2017130284 A | 7/2017 | |
| JP | 2017152383 A | 8/2017 | |
| JP | 2017220467 A | 12/2017 | |
| JP | 2018129153 A | 8/2018 | |
| WO | WO-2012173213 A1 * | 12/2012 | .......... H01M 4/0402 |
| WO | 2018025649 A1 | 2/2018 | |

OTHER PUBLICATIONS

Yuki Matsushita et al., U.S. Appl. No. 16/738,013, Final Office Action issued Dec. 24, 2021.

Yuki Matsushita et al., U.S. Appl. No. 16/738,013, Non-Final Office Action issued Apr. 26, 2022.

Yuki Matsushita et al., U.S. Appl. No. 16/738,013, Notice of Allowance issued Nov. 22, 2022.

* cited by examiner

FIG. 6A Before pressing (after coating)

FIG. 6B After pressing

ALL SOLID STATE BATTERY

RELATED APPLICATION

This application is a continuation of U.S. patent application Ser. No. 16/738,013, filed Jan. 9, 2020, which claims priority to Japanese Patent Application No. 2019-019555, filed on Feb. 6, 2019, including the specification, drawings and abstract, the entire disclosure of which is incorporated herein by reference.

TECHNICAL FIELD

The present disclosure relates to an all solid state battery wherein interface resistance between a current collector and an active material layer is low.

BACKGROUND ART

An all solid state battery is a battery including a solid electrolyte layer between a cathode and an anode, and an advantage thereof is that the simplification of a safety device may be more easily achieved compared to a liquid based battery including a liquid electrolyte containing a flammable organic solvent.

For example, Patent Literature 1 discloses an all solid state battery including an anode current collector layer, an anode active material layer, a solid electrolyte layer, a cathode active material layer, and a cathode current collector layer. Also, Patent Literatures 2 and 3 disclose an all solid state battery provided with an electron conductive layer including a carbon material, between a current collector and an active material layer. Meanwhile, Patent Literatures 4 and 5 disclose a non-aqueous battery including an electron conductive layer between a current collector and an active material layer, although it is not an all solid state battery. Similarly, although not a technology related to an all solid state battery, Patent Literature 6 discloses a solid oxide fuel cell (SOFC) including an electron conductive layer.

CITATION LIST

Patent Literatures

Patent Literature 1: Japanese Patent Application Laid-Open (JP-A) No. 2018-129153
Patent Literature 2: JP-A No. 2017-220467
Patent Literature 3: JP-A No. 2017-130284
Patent Literature 4: JP-A No. 2014-150052
Patent Literature 5: JP-A No. 2014-017199
Patent Literature 6: JP-A No. 2010-073648

SUMMARY OF DISCLOSURE

Technical Problem

For example, when a production method wherein an active material layer is formed, and then, a current collector is placed on the active material layer, is employed, a clearance gap is likely to occur in between the current collector and the active material layer. As the result, the interface resistance between the current collector and the active material layer is increased.

The present disclosure has been made in view of the above circumstances, and a main object of the present disclosure is to provide an all solid state battery wherein interface resistance between a current collector and an active material layer is low.

Solution to Problem

In order to solve the above object, the present disclosure provides an all solid state battery comprising: an electrode including a current collector, an electron conductive layer, and an active material layer, in this order, and a solid electrolyte layer formed on the active material layer side of the electrode, and the electron conductive layer is an agglutinate of metal particles or a metal foil, and electron conductivity of the electron conductive layer is $1 \times 10^3$ S/cm or more at 25° C.

According to the present disclosure, the interface resistance between the current collector and the active material layer may be decreased in the all solid state battery, by providing the electron conductive layer between the current collector and the active material layer.

In the disclosure, the electron conductivity of the electron conductive layer may be $2.1 \times 10^4$ S/cm or more at 25° C.

In the disclosure, the electron conductive layer may be the agglutinate of the metal particles.

In the disclosure, the agglutinate may include a binder.

In the disclosure, material of the metal particles or the metal foil may be a simple substance of Fe, Ni, or Al, or an alloy including at least one kind of these elements.

In the disclosure, an adhesive layer may be formed partially between the current collector and the electron conductive layer.

The present disclosure also provides a method for producing the above described all solid state battery, the method characterized by comprising steps of: a first stack forming step of obtaining a first stack by placing the metal particles or the metal foil on the active material layer, a second stack forming step of obtaining a second stack including the electron conductive layer by pressing the first stack, and a current collector placing step of obtaining the electrode by placing the current collector on the electron conductive layer of the second stack.

According to the present disclosure, the interface resistance between the current collector and the active material layer may be decreased in the all solid state battery, by providing the electron conductive layer between the current collector and the active material layer.

Advantageous Effects of Disclosure

The all solid state battery of the present disclosure exhibits effects such that the interface resistance between the current collector and the active material layer is low.

DESCRIPTION OF EMBODIMENTS

A. All Solid State Battery

Figure 1:
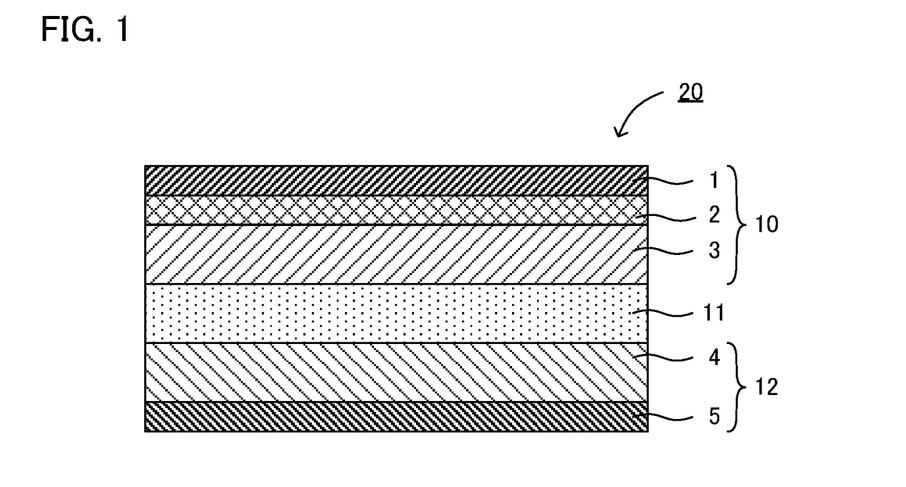
FIG. 1 is a schematic cross-sectional view showing an example of the all solid state battery in the present disclosure.

FIG. 1 is a schematic cross-sectional view showing an example of the all solid state battery in the present disclosure. All solid state battery 20 shown in FIG. 1 comprises cathode 10 including cathode current collector 1, electron conductive layer 2, and cathode active material layer 3, in this order, and solid electrolyte layer 11 formed on the cathode active material layer 3 side of cathode 10. All solid state battery 20 also comprises anode 12 including anode active material layer 4 and anode current collector 5. Incidentally, although FIG. 1 shows a case wherein the electrode in the present disclosure is a cathode, the electrode in the present disclosure may be an anode. Also, both of the cathode and the anode may be the electrode in the present disclosure. The electron conductive layer is an agglutinate of metal particles or a metal foil, and high in electron conductivity.

According to the present disclosure, the interface resistance between the current collector and the active material layer may be decreased in the all solid state battery, by providing the electron conductive layer between the current collector and the active material layer. As described above, for example, when a production method wherein an active material layer is formed, and then, a current collector is placed on the active material layer, is employed, a clearance gap is likely to occur in between the current collector and the active material layer. Typical examples of the clearance gap may include a micro clearance gap resulting from the surface roughness difference between the active material layer and the current collector, and a macro clearance gap resulting from the distortion of the current collector. When such a clearance gap occurs, the interface resistance between the current collector and the active material layer is likely to be increased. Incidentally, when the production method wherein an active material layer is formed, and then, a current collector is placed on the active material layer, is employed, there is an advantage that the fracture of the current collector edge (or current collector tab) caused by being pressed may be prevented.

Figure 2:
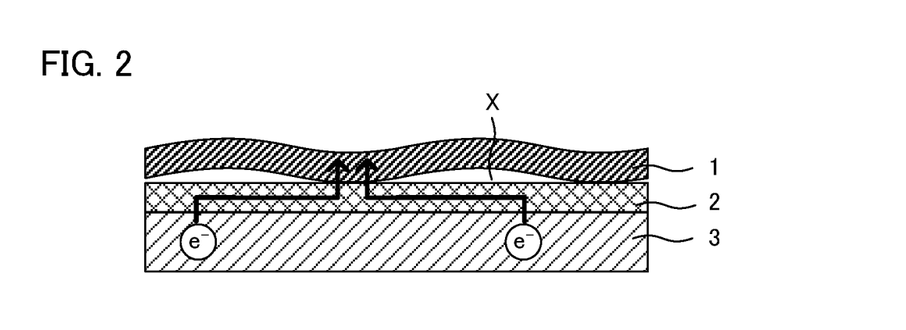
FIG. 2 is a schematic cross-sectional view illustrating the effects in the present disclosure.

In contrast to this, according to the present disclosure, the interface resistance between the current collector and the active material layer may be decreased in the all solid state battery, by providing the electron conductive layer between the current collector and the active material layer. As shown in FIG. 2, for example, even when clearance gap X resulting from the distortion of cathode current collector 1 occurs, since electron conductive layer 2 with high electron conductivity is provided between cathode current collector 1 and cathode active material layer 3, an electron in cathode active material layer 3 may move smoothly to cathode current collector 1 via electron conductive layer 2. As the result, the interface resistance between the current collector and the active material layer may be decreased.

The all solid state battery in the present disclosure will be hereinafter described in each constitution.

1. Electrode

The electrode in the present disclosure includes a current collector, an electron conductive layer, and an active material layer, in this order. The electrode may be a cathode, and may be an anode. The cathode includes a cathode current collector, an electron conductive layer, and a cathode active material layer, in this order. Meanwhile, the anode includes an anode current collector, an electron conductive layer, and an anode active material layer, in this order.

(1) Electron Conductive Layer

The electron conductive layer is a layer formed between the current collector and the active material layer. The electron conductive layer is an agglutinate of metal particles or a metal foil. The agglutinate of metal particles may be obtained by, for example, pressing the aggregate of the metal particles.

The electron conductivity (25° C.) of the electron conductive layer is usually $1 \times 10^3$ S/cm or more, may be $5 \times 10^3$ S/cm or more, and may be $2.1 \times 10^4$ S/cm or more. When the electron conductivity is too low, the interface resistance between the current collector and the active material layer may not be reduced in some cases.

Examples of the material of the metal particles or the metal foil may include a simple substance of Fe, Ni, or Al, or an alloy including at least one kind of these elements. Examples of an Fe alloy may include SUS.

When the electron conductive layer is the agglutinate of metal particles, this agglutinate may further include a binder. Examples of the binder may include fluorine based binders such as polyvinylidene fluoride (PVDF) and polytetrafluoroethylene (PTFE); and rubber based binders such as butylene rubber (BR), and styrene-butadiene rubber (SBR).

Also, the agglutinate may include a polymer. Examples of the polymer may include thermoplastic resin. Examples of the thermoplastic resin may include polypropylene, polyethylene, polyvinyl chloride, polystyrene, acrylonitrile butadiene styrene (ABS) resin, methacryl resin, polyamide, polyester, polycarbonate, and polyacetal. When the electron conductive layer includes the polymer, the polymer expands by heat so that PTC (Positive Temperature Coefficient) function is imparted to the electron conductive layer.

The electron conductive layer and the active material layer only have to overlap with each other in planar view at least at a part thereof, and preferably overlap with each other with more area. When the area of the active material layer is regarded as $S_1$, and the area of the region where the electron conductive layer and the active material layer overlap with each other is regarded as $S_2$, $S_2/S_1$ is, for example, 50% or more, may be 70% or more, and may be 90% or more.

The thickness of the electron conductive layer is, for example, 0.5 μm or more, and may be 1 μm or more. Meanwhile, the thickness of the electron conductive layer is, for example, 20 μm or less, and may be 10 μm or less.

(2) Active Material Layer

The active material layer in the present disclosure is a layer including at least an active material. Also, the active material layer may further include at least one of a solid electrolyte, a conductive material, a binder, and a thickener, in addition to the active material.

The active material may be a cathode active material, and may be an anode active material. Examples of the cathode active material may include rock salt bed type active materials such as lithium cobaltite ($LiCoO_2$), lithium nickelate ($LiNiO_2$) and $LiNi_{1/3}Co_{1/3}Mn_{1/3}O_2$; spinel type active materials such as lithium manganate ($LiMn_2O_4$), and $Li(Ni_{0.5}Mn_{1.5})O_4$; and olivine type active materials such as lithium titanate ($Li_4Ti_5O_{12}$), $LiFePO_4$, $LiMnPO_4$, $LiCoPO_4$, and $LiNiPO_4$. Examples of the shape of the cathode active material may include a granular shape and a thin-film shape. When the cathode active material has the granular shape, the cathode active material may be a primary particle and may be a secondary particle. Also, the average particle size ($D_{50}$) of the cathode active material is preferably, for example, 1 nm or more and 100 μm or less, and more preferably 10 nm or more and 30 μm or less.

Also, the cathode active material may be coated with a coating layer. The coating layer only have to have ion conductivity, and include a material capable of maintaining the form, without flowing, even when being contacted to the active material or the solid electrolyte. Examples of such material may include solid electrolytes such as $LiNbO_3$, $Li_4Ti_5O_{12}$, and $Li_3PO_4$. The content of the cathode active material in the cathode active material layer is preferably higher, in terms of capacity. It is, for example, 30 weight % or more, preferably 50 weight % or more, and more preferably 70 weight % or more.

Meanwhile, examples of the anode active material may include a metal active material and a carbon active material. Examples of the metal active material may include In, Al, Si, and Sn. Meanwhile, examples of the carbon active material may include mesocarbon microbead (MCMB), highly oriented graphite (HOPG), hard carbon, and soft carbon. Metal oxides such as lithium titanate ($Li_4Ti_5O_{12}$), for example, may also be used. Examples of the shape of the anode active material may include a granular shape and a thin-film shape. When the anode active material has the granular shape, the anode active material may be a primary particle and may be a secondary particle. Also, the average particle size ($D_{50}$) of the anode active material is preferably, for example, 1 nm or more and 100 μm or less, and more preferably 10 nm or more and 30 μm or less.

The solid electrolyte is not particularly limited as long as it has ion conductivity. Examples of the solid electrolyte may include inorganic solid electrolytes such as a sulfide solid electrolyte, and an oxide solid electrolyte. Examples of the sulfide solid electrolyte may include $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$P_2S_5$, and $Li_3PS_4$.

Examples of the conductive material may include a carbon material. Examples of the carbon material may include carbon blacks such as furnace black, acetylene black, Ketjen black, and thermal black; fibrous carbons such as carbon nanotube, and carbon nanofiber; activated carbon; carbon; graphite; graphene; and fullerene. Examples of the shape of the conductive material may include a granular shape. As the binder, for example, materials described in "(1) Electron conductive layer" above may be used.

The thickness of the active material layer is, for example, 0.1 μm or more and 1000 μm or less.

(3) Current Collector

The current collector in the present disclosure has a function of collecting electrons in the above described active material layer. The current collector may be a cathode current collector, and may be an anode current collector. Examples of the material for the cathode current collector may include SUS, Ni, Cr, Au, Pt, Al, Fe, Ti, and Zn. Meanwhile, examples of the material for the anode current collector may include SUS, Cu, Ni, Fe, Ti, Co, and Zn. Examples of the shape of the current collector may include a foil shape, a mesh shape, and a porous shape.

Also, an adhesive layer may be formed between the current collector and the electron conductive layer. The adhesive layer may be formed all over, may be formed partially (in a pattern), between the current collector and the electron conductive layer, and the latter is preferable so as not to inhibit the electron conductivity.

2. Solid Electrolyte Layer

The solid electrolyte layer in the present disclosure is a layer formed between the cathode and the anode in the all solid state battery. As the solid electrolyte used in the solid electrolyte layer, the materials similar to those described in "(2) Active material layer" above may be used.

Also, the solid electrolyte layer may include just the solid electrolyte, and may further include other material. Examples of the other material may include a binder. As for the binder, the materials similar to those described in "(2) Active material layer" above may be used. The thickness of the solid electrolyte layer is preferably, for example, 0.1 μm or more and 1000 μm or less.

3. All Solid State Battery

The all solid state battery in the present disclosure may further include a confining jig that applies a confining pressure along the thickness direction, to the cathode, the solid electrolyte layer and the anode. A known jig may be used as the confining jig. The confining pressure is, for example, 0.1 MPa or more, and may be 1 MPa or more. Meanwhile, the confining pressure is, for example, 50 MPa or less, and may be 20 MPa or less. Particularly, the interface resistance between the current collector and the active material layer in the all solid state battery in the present disclosure is low, even though the confining pressure is low. Specifically, as described in Examples later, the interface resistance may be kept low, even though the confining pressure is 5 MPa or less. Since the confining pressure is low, the all solid state battery may be made smaller.

The all solid state battery in the present disclosure is preferably an all solid state lithium battery. Also, the all solid state battery may be a primary battery, and may be a secondary battery. Among the above, the secondary battery is preferable, so as to be repeatedly charged and discharged, and is useful as, for example, a car-mounted battery. Also, the all solid state battery in the present disclosure may be a single cell battery and may be a stacked battery. The stacked battery may be a monopolar type stacked battery (a stacked battery connected in parallel), and may be a bipolar type stacked battery (a stacked battery connected in series). Examples of the shape of the all solid state battery may include a coin shape, a laminate shape, a cylindrical shape, and a square shape.

B. Method for Producing all Solid State Battery

The method for producing an all solid state battery in the present disclosure is a method for producing the all solid state battery described in "A. All solid state battery" above, and the method comprises steps of: a first stack forming step of obtaining a first stack by placing the metal particles or the metal foil on the active material layer, a second stack forming step of obtaining a second stack including the electron conductive layer by pressing the first stack, and a current collector placing step of obtaining the electrode by placing the current collector on the electron conductive layer of the second stack.

According to the present disclosure, the interface resistance between the current collector and the active material layer may be decreased in the all solid state battery, by providing the electron conductive layer between the current collector and the active material layer.

1. First Stack Forming Step

The first stack forming step in the present disclosure is a step of obtaining a first stack by placing the metal particles or the metal foil on the active material layer. The metal particles or the metal foil in the first stack corresponds to a precursor layer of the electron conductive layer.

Examples of the first stack may include (i) a stack including a cathode active material layer and metal particles or a metal foil, in this order, (ii) a stack including an anode active material layer and metal particles or a metal foil, in this order, (iii) a stack including a solid electrolyte layer, a cathode active material layer and metal particles or a metal foil, in this order, (iv) a stack including a solid electrolyte layer, an anode active material layer and metal particles or a metal foil, in this order, (v) a stack including an anode current collector, an anode active material layer, a solid electrolyte layer, a cathode active material layer, and metal particles or a metal foil, in this order, (vi) a stack including a cathode current collector, a cathode active material layer, a solid electrolyte layer, an anode active material layer, and metal particles or a metal foil, in this order.

Examples of a method for placing the metal particles on the active material layer may include a method of coating the active material layer with a slurry including metal particles, a binder and a solvent. Even when the surface of the active material layer is rough, a precursor layer that traces the roughness of the active material layer surface may be obtained in this method.

The proportion of the metal particles in the solid components of the slurry is, for example, 70 volume % or more, may be 80 volume % or more, may be 90 volume % or more, and may be 95 volume % or more. Also, examples of the solvent may include organic solvents such as butyl butyrate.

Also, in the present disclosure, a precursor layer may be formed by using a transfer sheet including a base material and a precursor layer and transferring the precursor layer from the transfer sheet onto the active material layer.

2. Second Stack Forming Step

The second stack forming step in the present disclosure is a step of obtaining a second stack including the electron conductive layer by pressing the first stack. The precursor layer is densified by pressing, and the electron conductive layer is formed.

Examples of the press may include a roll press and a plate press. In case of the roll press, a line pressure is, for example, 3 ton/cm or more, and may be 4 ton/cm or more. Meanwhile, the line pressure is, for example, 8 ton/cm or less, and may be 6 ton/cm or less. A feeding rate in the roll press is, for example, 0.1 m/min or more and 1 m/min or less. Also, the press may be a hot press. A temperature of the hot press is, for example, 120° C. or more, may be 140° C. or more, and may be 160° C. or more. Meanwhile, the temperature of the hot press is, for example, 200° C. or less, and may be 190° C. or less.

3. Current Collector Placing Step

The current collector placing step in the present disclosure is a step of obtaining the electrode by placing the current collector on the electron conductive layer of the second stack. By placing the current collector after the second stack forming step, a fracture of a current collector edge (or current collector tab) due to the pressing may be prevented.

Examples of a method for placing the current collector may include a method of using an adhesive such as a hot melt. The adhesive is preferably formed partially (in a pattern) at a corner of the current collector so as not to inhibit electron conductivity. By coating four corners of the current collector with the adhesive, for example, the current collector and the electron conductive layer may be fixed stably while preventing the inhibition of the electron conductivity.

4. Additional Step

As an additional step, the method may include, for example, a trimming step of adjusting the size of the second stack by cutting with a laser, in between the second stack forming step and the current collector placing step. Also, when the electron conductive layer is the metal foil, a laser absorption region with a high laser absorption rate is preferably provided at the laser cutting position of the metal foil. The reason therefor is to carry out a stable laser cut along the laser absorption region. The laser absorption region may be formed by using, for example, a coloring material such as an oil-based marker (Microperm 03, ink color number #49) from Sakura Color Products Corp.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

Example 1

<Production of Slurry for Electron Conductive Layer>

Ni particles and a binder (PVDF) were weighed so as the volume ratio was Ni particles:binder=95:5, added to butyl butyrate as a solvent, and stirred. Thereby, a slurry for the electron conductive layer (solid content ratio: 16.1 volume %) was obtained.

<Production of Anode Slurry>

An anode slurry was obtained by stirring a mixture of butyl butyrate, a butyl butyrate solution containing a PVDF based binder (from Kureha Corp.) of 5 weight %, an anode active material ($Li_4Ti_5O_{12}$, from Ube Industries, Ltd.), a sulfide solid electrolyte ($Li_2S$—$P_2S_5$ based glass ceramic including LiI and LiBr, average particle size $D_{50}$=0.8 μm), and a conductive material (VGCF, from Showa Denko K. K.) with an ultrasonic dispersion apparatus.

<Production of Cathode Slurry>

Using a tumbling fluidized bed granulating-coating machine (from Powrex Corp.), a cathode active material ($Li_{1.15}Ni_{1/3}Co_{1/3}Mn_{1/3}W_{0.005}O_2$) was coated with $LiNbO_3$ in the atmospheric environment. After that, by burning thereof in the atmospheric environment, a coated cathode active material was obtained.

A cathode slurry was obtained by stirring a mixture of butyl butyrate, a butyl butyrate solution containing a PVDF based binder (from Kureha Corp.) of 5 weight %, the coated cathode active material, a sulfide solid electrolyte ($Li_2S$—$P_2S_5$ based glass ceramic including LiI and LiBr, average particle size $D_{50}$=0.8 μm), and a conductive material (VGCF, from Showa Denko K. K.) with a biaxial kneader. A base material (Al foil) was coated with the obtained cathode slurry to obtain a transfer sheet for the cathode active material layer.

<Production of Slurry for Solid Electrolyte Layer>

A slurry for the solid electrolyte layer was obtained by stirring a mixture of heptane, a heptane solution containing a butylene rubber based binder (from JSR Corp.) of 5 weight %, and a sulfide solid electrolyte ($Li_2S$—$P_2S_5$ based glass ceramic including LiI and LiBr, average particle size $D_{50}$=2.5 μm) by using an ultrasonic dispersion apparatus and an agitation mixer. A base material (Al foil) was coated with the obtained slurry to obtain a transfer sheet for the solid electrolyte layer.

<Production of all Solid State Battery>

Figure 3A:
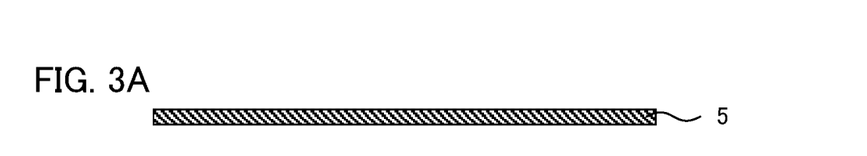
FIGS. 3A to 3E are schematic cross-sectional views illustrating the method for producing the all solid state battery in Examples.
Figure 3B:
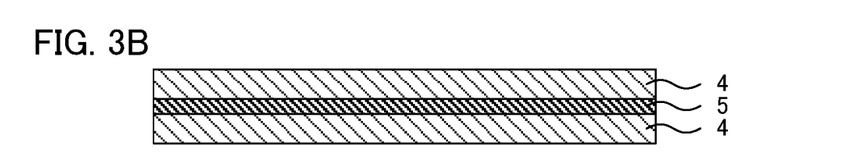
Figure 3C:
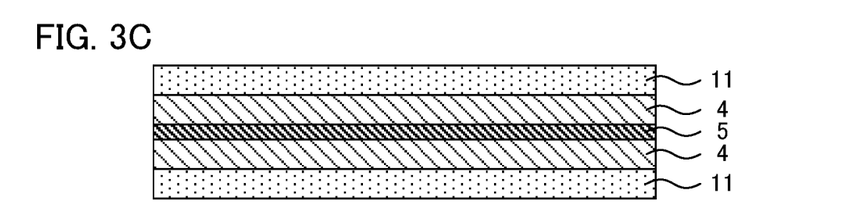
Figure 3D:
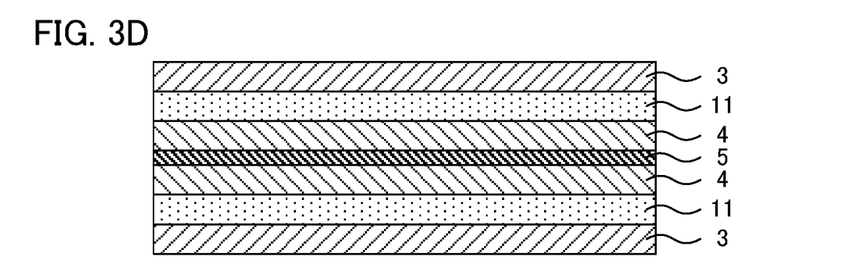
Figure 3E:
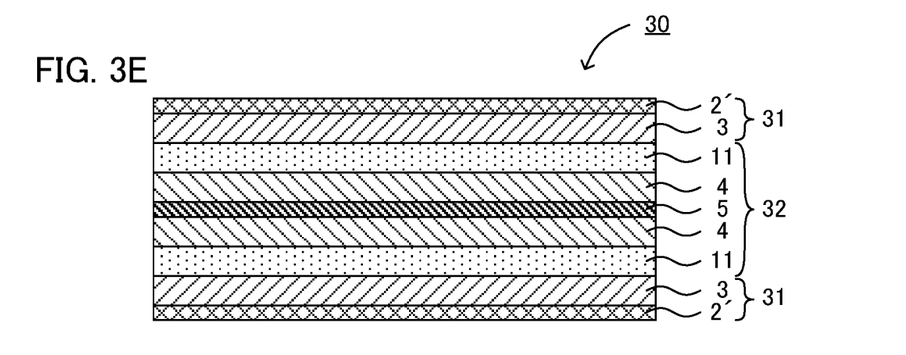

An all solid state battery was produced by a roll-to-roll method. A method for producing an all solid state battery will be explained using FIGS. 3A to 3E and FIGS. 4A to 4D. First, anode current collector 5 (Cu foil from Fukuda Metal Foil & Powder Co., Ltd.) was prepared (FIG. 3A). Next, one surface of anode current collector 5 was coated with the anode slurry, and then, the other surface of anode current collector 5 was coated with the anode slurry. Thereby, anode active material layer 4 was formed on both surfaces of anode current collector 5 (FIG. 3B). Next, by using the transfer sheet for the solid electrolyte layer, solid electrolyte layer 11 was transferred to the surface of anode active material layer 4 with a roll press machine (FIG. 3C). Next, by using the transfer sheet for the cathode active material layer, cathode active material layer 3 was transferred to the surface of solid electrolyte layer 11 with a roll press machine (FIG. 3D). Next, the surface of cathode active material layer 3 was coated with the slurry for the electron conductive layer to form precursor layer 2' of the electron conductive layer (FIG. 3E). Thereby, first stack 30 was obtained. First stack 30 includes first member 31 containing precursor layer 2' and cathode active material layer 3, and second member 32 containing anode current collector 5, anode active material layer 4, and solid electrolyte layer 11.

Figure 4A:
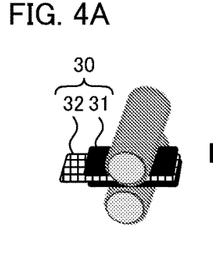
FIGS. 4A to 4D are schematic perspective views illustrating the method for producing the all solid state battery in Examples.
Figure 4B:
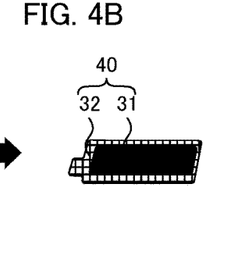
Figure 4C:
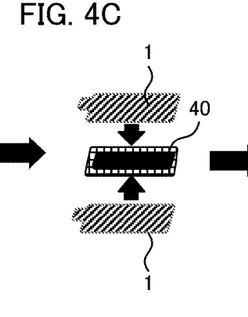
Figure 4D:
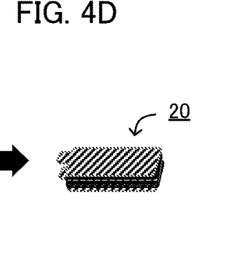

Next, a hot roll press was carried out to first stack 30 under conditions of 170° C. and line pressure of 5 ton/cm (FIG. 4A). Thereby, first stack 30 was densified, and second stack 40 was obtained (FIG. 4B). Incidentally, although not shown in the figure, electron conductive layer 2 was formed from precursor layer 2' by the hot roll press. Next, second stack 40 was trimmed with a laser. Next, cathode current collector 1 (Al foil) was adhered to both surfaces of second stack 40 with a hot melt agent (FIG. 4C). Thereby, all solid state battery 20 was obtained (FIG. 4D). The battery area of the obtained all solid state battery was 98 cm². Also, an all solid state battery with the battery area of 302 cm² was similarly produced.

Example 2

An all solid state battery was obtained in the same manner as in Example 1 except that an Al foil was used as the electron conductive layer instead of the slurry for the electron conductive layer.

Comparative Example 1

An all solid state battery was obtained in the same manner as in Example 1 except that the electron conductive layer was not formed.

Comparative Example 2

A conductive material (furnace black from Tokai Carbon Co., Ltd.) and PVDF (from Kureha Corp.) were mixed with N-methylpyrrolidone (NMP) so as the volume ratio was conductive material:PVDF=85:15, and a slurry for a carbon coating was obtained. An all solid state battery was obtained in the same manner as in Example 1 except that the obtained slurry was used instead of the slurry for the electron conductive layer.

[Evaluation]

<Measurement of Electron Conductivity>

The electron conductivity (25° C.) of the electron conductive layers produced in Examples 1, 2 and Comparative Example 2 was measured. In the method for measuring the electron conductivity, a resistance meter and a dedicated probe were used for measuring. The results are shown in Table 1.

TABLE 1

|  | Electron conductive layer | Electron conductivity (S/cm) |
| --- | --- | --- |
| Example 1 | Ni coated | $2.19 \times 10^4$ |
| Example 2 | Al foil | $3.55 \times 10^5$ |
| Comp. Ex. 2 | C coated | 5.53 |

Figure 5:
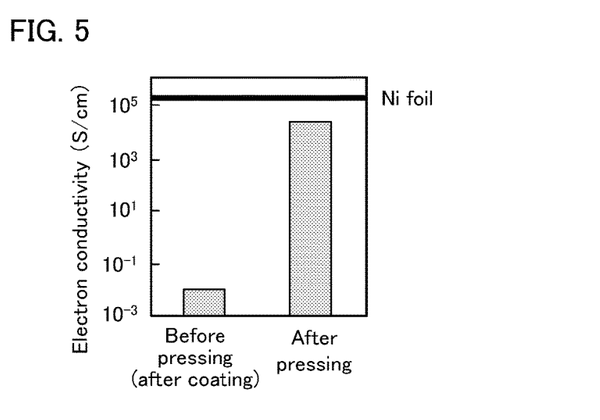
FIG. 5 is the result of the electron conductivity of the precursor layer and the electron conductive layer in Example 1.
Figure 6A:
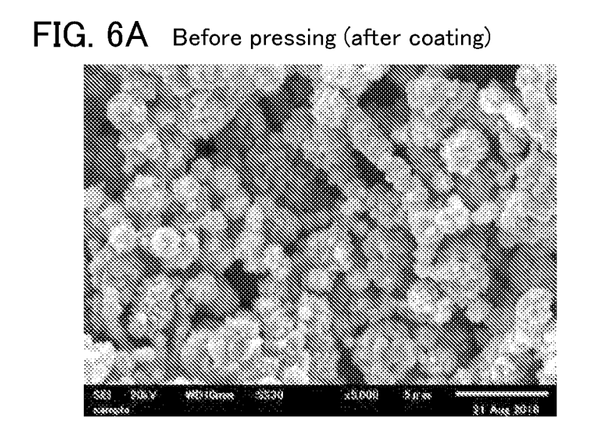
FIGS. 6A and 6B are SEM images of the precursor layer and the electron conductive layer in Example 1.
Figure 6B:
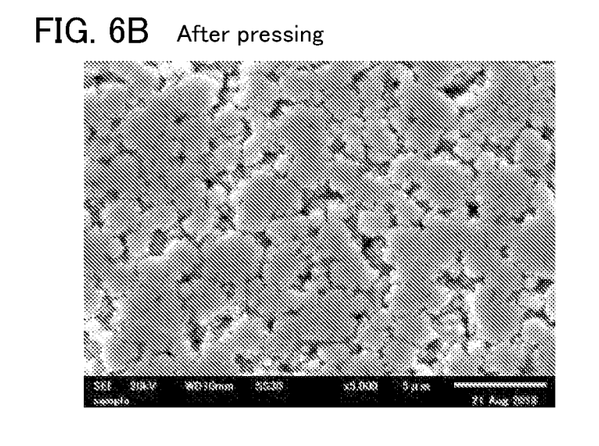

As shown in Table 1, the electron conductivity in Examples 1 and 2 was $10^3$ S/cm or more, and the electron conductivity was higher than Comparative Example 2. Also, as shown is FIG. 5, although the electron conductivity of the electron conductive layer before hot roll pressing, that is, the precursor layer in Example 1 (Ni coated) was approximately $10^{-2}$ S/cm, the electron conductivity of the electron conductive layer after hot roll pressing was $2.19 \times 10^4$ S/cm, and possession of an electron conductivity equivalent to a Ni foil was confirmed. Also, it was confirmed that, although the Ni particles existed in a granular form in the precursor layer as shown in FIG. 6A, the Ni particles in the electron conductive layer were plastically deformed as shown in FIG. 6B. It is believed that the electron conductivity was improved to equivalent to a Ni foil since the Ni particles were plastically deformed.

<Measurement of Battery Resistance>

The battery resistance of the all solid state batteries obtained in Examples 1 and 2 and Comparative Examples 1 and 2 was measured. In the method for measuring the battery resistance, a resistance meter and a dedicated probe were used for measuring. The results are shown in FIG. 7 and FIG. 8.

Figure 7:
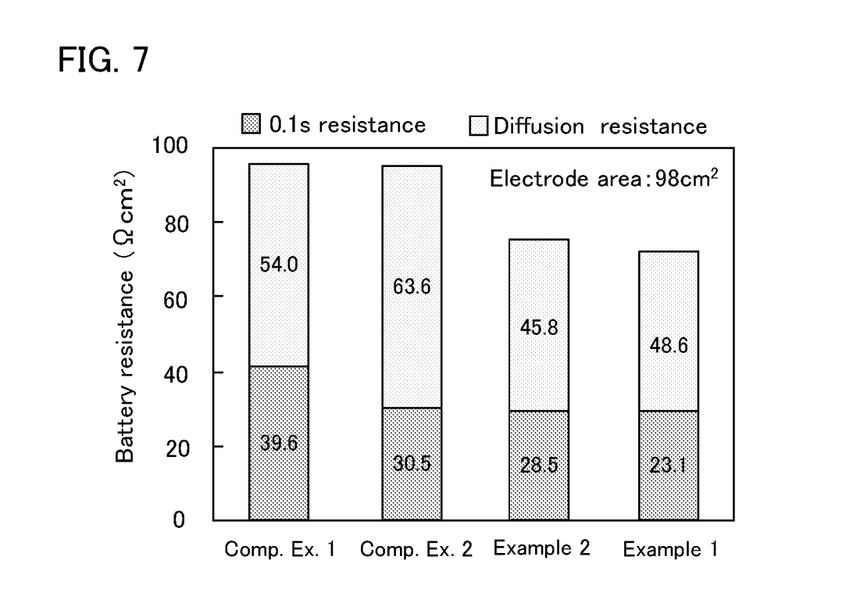
FIG. 7 is the result of the resistance measurement to the all solid state batteries obtained in Examples 1 and 2 and Comparative Examples 1 and 2.
Figure 8:
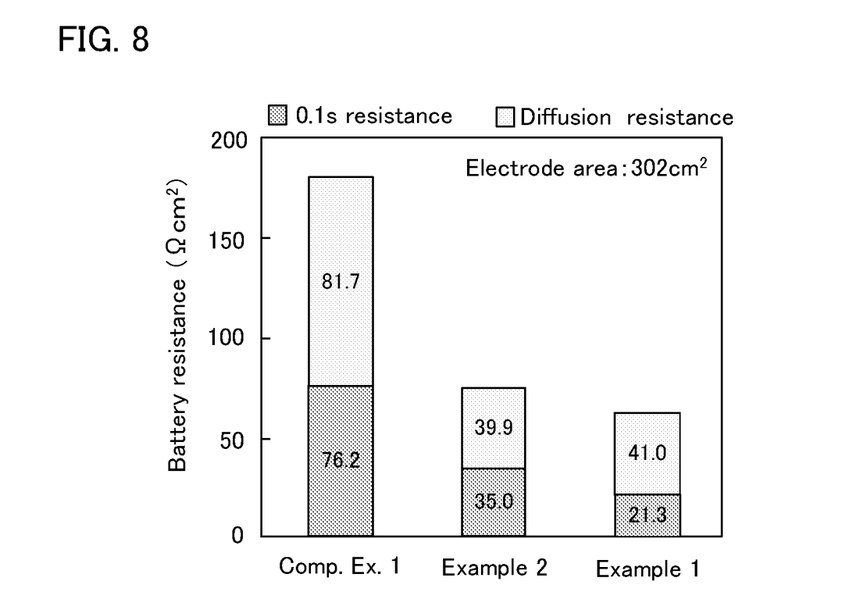
FIG. 8 is the result of the resistance measurement to the all solid state batteries obtained in Examples 1 and 2 and Comparative Example 1.

As shown in FIG. 7 and FIG. 8, the battery resistance was lower in Examples 1 and 2 than Comparative Examples 1 and 2. Also, when the battery size was larger, the battery resistance was notably lower in Examples 1 and 2 than Comparative Example 1. The reason therefor is presumed that, since undulation, for example, is likely to occur in a battery with larger size, the effects of the present disclosure may be achieved more.

<Measurement of Interface Resistance>

Figure 9:
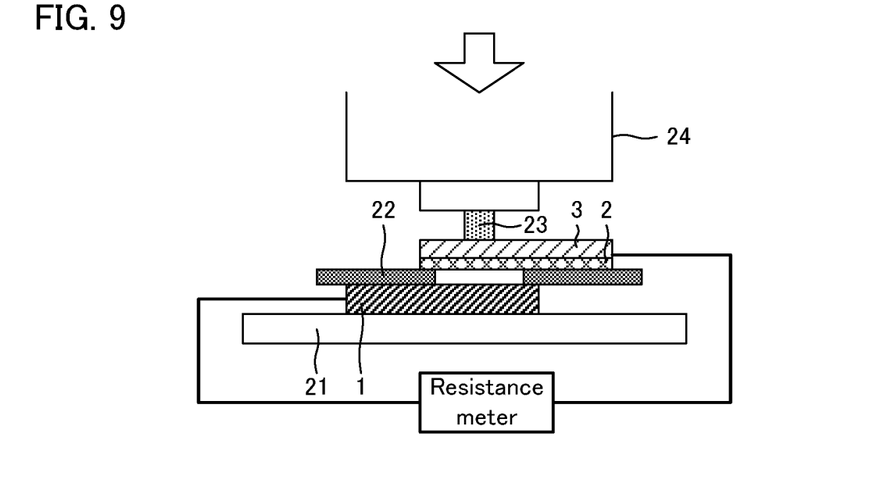
FIG. 9 is a schematic cross-sectional view illustrating the method for measuring an interface resistance.

The interface resistance of the cathode active material layer used in Example 1, with the cathode current collector and the electron conductive layer formed thereon, was measured. Specifically, as shown in FIG. 9, cathode current collector 1 was placed on bakelite plate 21, kapton film 22 having a through section was placed on cathode current collector 1, and cathode active material layer 3 with electron conductive layer 2 formed thereon was placed on kapton film 22 so that electron conductive layer 2 faced cathode current collector 1 side. Further, SK material block 23 of ϕ11.28 mm was placed on cathode active material layer 3 so as to overlap the through section of kapton film 22 in plan view. In this situation, the resistance value was measured with a resistance meter (RM3542, from Hioki E. E. Corp.) while varying the applied pressure with autograph 24. Also, for Comparative Example 1, the interface resistance between the cathode current collector and the cathode active material layer was measured in the same manner described above except that an electron conductive layer was not formed.

The interface resistance was calculated as the difference between the resistance as a whole, and the resistance of the cathode active material layer and the cathode current collector. These results are shown in FIG. 9. The ratio of the interface resistance at 0 MPa to the interface resistance at 10 MPa was also calculated. These results are shown in Table 2.

TABLE 2

| | Interface resistance ($\Omega \cdot cm^2$) | | |
|---|---|---|---|
| | 0 MPa | 10 MPa | 0 MPa/10 MPa |
| Example 1 | 3.2 | 3.0 | 1.07 |
| Comp. Ex. 1 | 61.7 | 10.9 | 5.66 |

Figure 10:
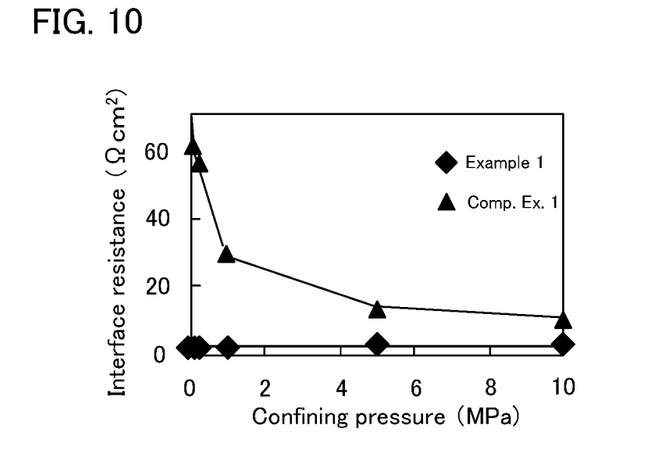
FIG. 10 is the result of the interface resistance measurement in Example 1 and Comparative Example 1.

As shown in Table 2 and FIG. 10, the interface resistance between the current collector and the active material layer under non-confined condition (0 MPa) in Example 1 was much lower than Comparative Example 1. Also, when the confining pressure was changed from 0 MPa to 10 MPa, the interface resistance in Comparative Example 1 was notably decreased. The reason therefor is presumed that the clearance gap between the current collector and the active material layer was resolved in Comparative Example 1 by applying a confining pressure. Meanwhile, no major change was confirmed in the interface resistance in Example 1. The reason therefor is presumed that the current collector and the active material layer were densely unified.

Examples 3 to 5

An all solid state battery was obtained in the same manner as in Example 1 except that the proportion of the Ni particles and the binder (PVDF) was changed to the proportion shown in Table 3.

TABLE 3

| | Ni particles (vol %) | Binder (vol %) |
|---|---|---|
| Example 1 | 95 | 5 |
| Example 3 | 90 | 10 |
| Example 4 | 80 | 20 |
| Example 5 | 70 | 30 |

Figure 11:
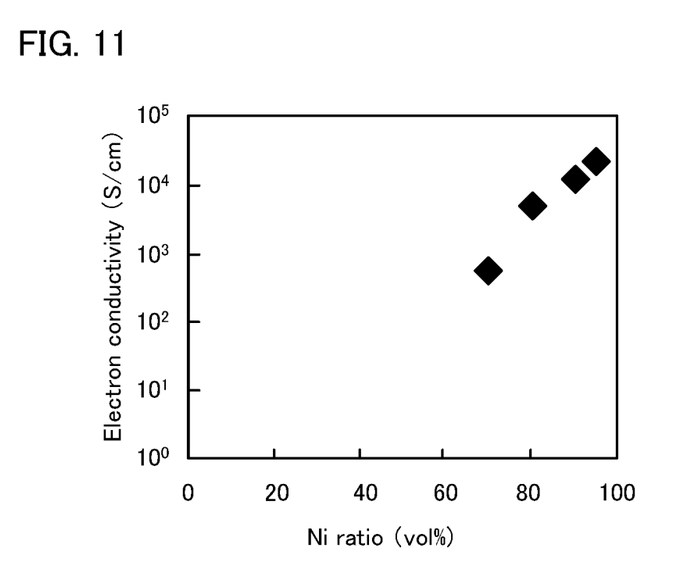
FIG. 11 is the result of the electron conductivity of the electron conductive layers in Examples 1, 3 to 5.

The electron conductivity (25° C.) of the electron conductive layers produced in Examples 3 to 5 was measured. These results are shown in FIG. 11. As shown in FIG. 11, it was confirmed that, as the proportion of the Ni particles became higher, the electron conductivity became higher. Also, it was suggested that, when the proportion of the Ni particles is 72 volume % or more, the electron conductivity will be $1\times10^3$ S/cm or more, by calculating an approximate formula based on the results shown in FIG. 11.

REFERENCE SIGNS LIST 1 cathode current collector
2 electron conductive layer
3 cathode active material layer
4 anode active material layer
5 anode current collector
10 cathode
11 solid electrolyte layer
12 anode
20 all solid state battery

What is claimed is:

1. An all solid state battery comprising an electrode and a solid electrolyte layer,
the electrode includes a current collector, an electron conductive layer, and an active material layer, in this order,
the solid electrolyte layer formed on the active material layer side of the electrode,
the electron conductive layer is an agglutinate of metal particles,
electron conductivity of the electron conductive layer is $1\times10^3$ S/cm or more at 25° C.,
the active material layer comprises an active material and an inorganic solid electrolyte, and
the solid electrolyte layer comprises an inorganic solid electrolyte, and
the electrode is obtained by a method comprising steps of:
a first stack forming step of obtaining a first stack by placing the metal particles on the active material layer,
a second stack forming step of obtaining a second stack including the electron conductive layer by hot pressing the first stack, and
a current collector placing step of obtaining the electrode by placing the current collector on the electron conductive layer of the second stack,
wherein the first stack is formed by coating the active material layer with a slurry including metal particles in the first stacking step, and
the metal particles are plastically deformed in the second stack forming step.

2. The all solid state battery according to claim 1, wherein the first stack is pressed by a hot roll press with a line pressure of 3 ton/cm or more in the second stack forming step.

3. The all solid state battery according to claim 1, wherein the electron conductivity of the electron conductive layer is $2.1\times10^4$ S/cm or more at 25° C.

4. The all solid state battery according to claim 1, wherein the agglutinate includes a binder.

5. The all solid state battery according to claim 1, wherein material of the metal particles comprises Fe, Ni, or Al, or an alloy including at least one kind of these elements.

6. The all solid state battery according to claim 1, wherein an adhesive layer is formed partially between the current collector and the electron conductive layer.

7. The all solid state battery according to claim 1, wherein the electron conductive layer is the agglutinate of the metal particles, the agglutinate includes a binder, and the proportion of the metal particles, to the total of the metal particles and the binder, is 90 vol % or more.

8. The all solid state battery according to claim 1, wherein the electron conductive layer does not include a binder.

9. The all solid state battery according to claim 1, wherein a material of the metal particles comprises Fe, Ni, or Al, or an alloy including at least one kind of these elements, the agglutinate includes a binder, and the proportion of the metal particles, to the total of the metal particles and the binder, is 90 vol % or more.

10. The all solid state battery according to claim 1, wherein the metal particles are Ni particles, the agglutinate includes a binder, and the proportion of the Ni particles, to the total of the Ni particles and the binder, is 90 vol % or more and 95 vol % or less.

\* \* \* \* \*